United States Patent Office 3,401,955
Patented Sept. 17, 1968

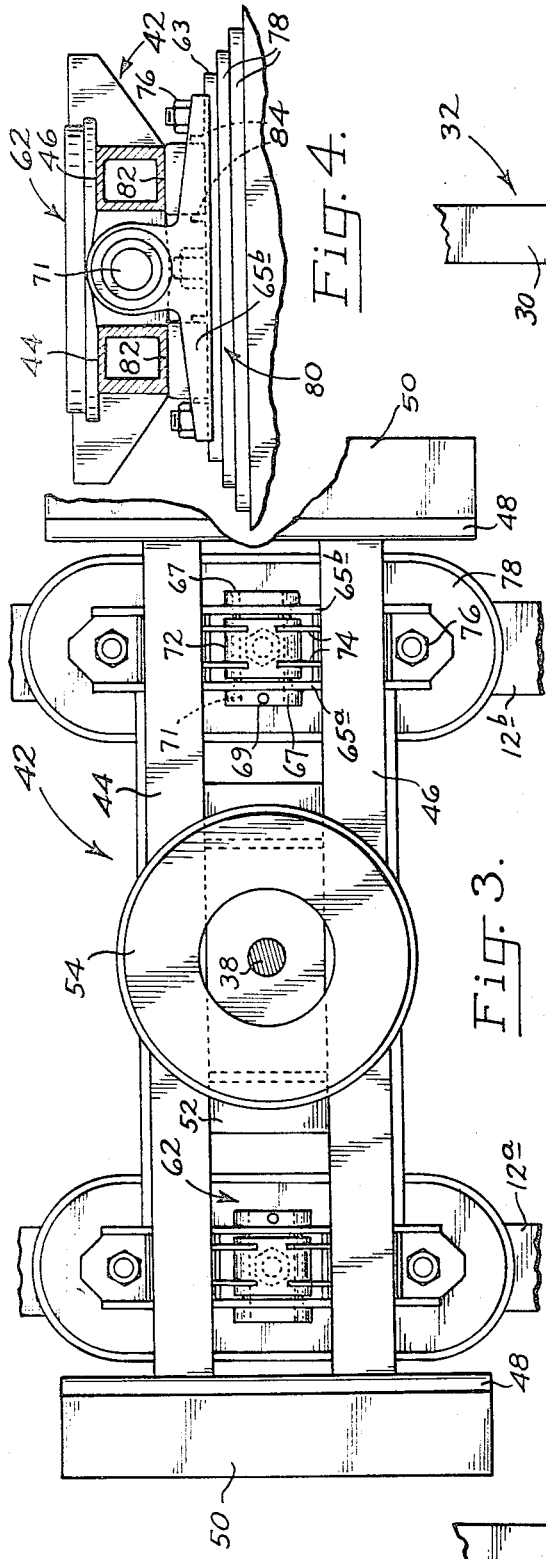

3,401,955
LOGGING VEHICLE WITH ARTICULATED
LOAD CARRIER
Harry K. Alton, Portland, Oreg., assignor to Pierce Trailer
& Equipment Company, Portland, Oreg., a corporation
of Oregon
Filed Sept. 12, 1966, Ser. No. 578,805
5 Claims. (Cl. 280—404)

ABSTRACT OF THE DISCLOSURE

A truck equipped with a bunk having opposed upright stakes, where the bunk is swiveled on an underlying, transversely extending, supporting frame. Each end of such supporting frame, where it extends over frame longitudinals of the frame, is biased by opposed elastomer pads to a position whereby the stakes of the bunk are maintained upright. Trunnion assemblies mount the supporting frame on the vehicle frame longitudinals, which accommodate pivoting of the supporting frame about a generally horizontal axis extending transversely of the vehicle.

---

This invention relates to vehicles in general, and more particularly to novel structure for carrying a load in a truck and trailer combination.

In certain types of hauling operations, it is customary to support the load being handled by a bunk provided adjacent each end of the load, which bunk includes opposed stakes which cradle the load. By way of example, in the logging industry it is common to move logs to a mill employing a logging trailer and truck equipped with such bunks. The organization described has several advantages when used for such purposes, since a trailer of relatively light mass in comparison to the load handled may be employed, the cost of the trailer is low in comparison to other types of units, and in a return trip the trailer is readily positioned on the truck to be borne by the truck with elimination of tire wear, etc. The invention will be described hereinbelow in connection with a logging trailer and truck combination, although it should be understood that this is for purposes of illustration only, and it is not thereby intended to be limited to specific uses of the invention.

A common deficiency in existing truck and trailer units of the type described is that the bunk cradling the forward end of the load is not capable of properly moving with the load with the usual shifting of the load relative to the truck which normally occurs during travel of the truck and trailer. As a consequence, the bunk and its mounting are continually subjected to rather severe stressing, which ultimately can result in part failure. Furthermore, rubbing of the load by the bunk occurs, which is undesirable.

In general terms, this invention contemplates a novel construction for the load carrier, i.e., bunk, and its mounting, which takes care of the above-indicated difficulties in a highly practical and satisfactory manner.

More specifically, this invention contemplates a bunk, and mounting for the bunk, for carrying the forward end of a load in a truck and trailer combination, wherein the bunk, in addition to being allowed to swivel about an upright axis to take care of load shift during turns, is swingable about an axis extending transversely of the truck disposed somewhat below the bunk, whereby the bunk may accommodate displacement of the load from a substantially horizontal position to an inclined position relative to the truck, upon the truck and trailer combination traveling over a road surface that supports the truck and trailer wheels at dissimilar elevations. Biasing means is included for yieldably resisting movement of the bunk away from a position wherein the stakes of the bunk are upright.

It is contemplated that the trailer of the truck and trailer combination be coupled to the truck at approximately the level where the bunk is supported for swinging movement about this horizontal transverse axis, normally at a point in the truck which is spaced somewhat to the rear of this horizontal axis.

A more specific feature and object of the invention is the provision of novel means for mounting a bunk on a truck, which by spaced trunnion assemblies permits pivotal movement of a supporting frame assembly which supports the bunk. The trunnions provide a firm footing for the supporting frame assembly on the frame of the truck, and through the supporting frame assembly, the bunk which rests on top of the frame assembly.

These and other objects and advantages are attained by the invention, and the same is described hereinbelow in conjunction with the accompanying drawings, wherein:

FIG. 1 is a view, somewhat simplified, illustrating a truck and trailer combination, more specifically one designed for the hauling of logs, constructed according to an embodiment of the invention;

FIG. 2 is a cross-sectional view, on a somewhat larger scale, taken along the line 2—2 in FIG. 1, showing how a forward bunk in the truck and trailer is mounted on the truck frame;

FIG. 3 is a view taken along the line 3—3 in FIG. 2, further illustrating the mechanism provided for mounting the bunk; and FIG. 4 is a cross-sectional view, taken generally along the line 4—4, in FIG. 2.

Referring now to the drawings, illustrated generally at 10 is a truck and tractor combination, including a truck or tractor 10a, also referred to herein as a vehicle, and a trailer 10b.

Truck 10a includes the usual truck frame 12 comprising, as can best be seen in FIGS. 2 and 3, elongated frame members 12a, 12b. Supporting the truck for rolling movement over the ground are front and rear wheels 14a, 14b, respectively. A cab for the truck is shown at 16 which houses the operator and the usual truck controls.

Trailer 10b includes trailer wheels 18 supporting the trailer for movement over the ground. These wheels support the rear of the trailer only. Projecting upwardly from the trailer adjacent the rear wheels are opposed lateral stakes, such as stake 20, of a bunk generally designated at 22. In FIG. 1 only one of the stakes is visible, as the other is obscured by the load handle, which comprises logs shown at 24.

Trailer 18 further includes an elongated reach 26, also referred to herein as beam assembly, which extends forwardly from the trailer wheels and is secured to the truck through a coupling designated by reference numeral 28. This coupling may be conventional and includes a hook or other coupling part mounted midway between the sides of the vehicle frame adjacent its rear end, and an eye or second coupling part carried by the forward end of reach 26. The coupling provides for swiveling of the trailer relative to the frame of the tractor or truck, such as to accommodate maneuvering of the truck and trailer combination on a curve, and also up and down movement of the trailer wheels relative to the wheels of the truck, as when the truck and trailer are traveling over ground surfaces at different elevations. Such couplings are conventional, and no detailed showing of the coupling was thought necessary for an understanding of the invention.

The load, more specifically logs 24, have their forward ends cradled between opposed upstanding stakes 30 of a forward bunk 32. This bunk is mounted on the frame of the truck in a novel manner whereby a limited amount of movement is permitted the bunk to take care of the usual changes in the position of the load relative to the truck which occur on travel of the truck and trailer.

Considering in further detail the construction of the bunk, and its mounting on the truck frame, and referring now also to FIGS. 2, 3, and 4, bunk 32 includes, in addition to opposed stakes 30, an elongated base 34 extending transversely of the truck frame which joins the bottom ends of stakes 30. The base provides support for the bottom of the load cradled in the bunk. Joined to the underside of base 34 midway between its ends is an upper fifth wheel plate 36 of generally circular outline, and a pin 38 disposed centrally of this plate and extending vertically downwardly therefrom. These elements form part of a fifth wheel connection holding the bunk in place while accommodating swiveling of the bunk about an upright axis. Also suitably fixed to the underside of the base adjacent its ends are shoes 40.

Interposed between bunk 32 and the truck or tractor frame is an elongated supporting frame assembly 42, or sub-bunk, also extending transversely of the tractor frame. The sub-bunk supports bunk 32 while yieldably accommodating swinging of the bunk relative to the tractor frame about a generally horizontal, transversely extending axis spaced somewhat below bunk base 34.

More specifically, frame assembly 42 comprises a pair of elongated, laterally spaced-apart, substantially parallel bars 44, 46. Joining together each adjacent set of ends of the bars are angle iron pieces 48 with rub irons 50 joined to the top faces of these pieces. These rub irons underlie the bottom surfaces of shoes 40, earlier described, and slidably support these shoes and through the shoes any load carried by bunk 32. Also joined together the bars at locations spaced inwardly from their ends are angle iron pieces 52.

Fastened to the top surfaces of bars 44, 46 is a lower fifth wheel plate 54. Also joined to the bars and beneath this fifth wheel plate is a plate 56 containing a bore 58 extending downwardly through the center thereof. With the sub-bunk or frame assembly 42 in its normal, at rest position, the top face of fifth wheel plate 54 is substantially horizontal and faces upwardly.

Pin 38 extends downwardly through bore 58 and may have a fastener, such as that shown at 60, mounted thereon holding the pin against retraction from the bore. Upper fifth wheel plate 36 rests on the lower fifth wheel plate, and thus the upper and lower fifth wheel plates and pin cooperate to form a fifth wheel connection between the supporting frame assembly and bunk.

Adjacent each side of the truck, and mounting an adjacent set of ends of bars 44, 46 on the truck frame is a trunnion assembly 62. Specifically, each trunnion assembly comprises a base plate 63 which has joined to it along opposite side edges, as by welding, a pair of oppositely disposed trunnion plates 65a, 65b. Doublers 67 are joined to and project outwardly from the outer faces of trunnion plates 65a, 65b. Journaled in the doublers, and held in place as by roll pin 69, is a trunnion pin 71.

Completing the description of the trunnion assembly, journaled on the roll pin and encircling the pin in the space between the two trunnion plates is a sleeve 72. Such sleeve is fastened to bars 44, 46 through trunnion gussets 74.

Trunnion pins 71 of the two trunnion assemblies are aligned in a horizontal direction extending transversely of the truck frame. The trunnion assemblies together provide a pivot axis for supporting frame assembly 42, which pivot axis is spaced somewhat below the bunk and coincides with the aligned axes of the trunnion pins.

The base plates of the two trunnion assemblies are joined to truck frame members 12a, 12b as by fastening them through fasteners 76 to pads 78, which pads are joined as by welding to frame members 12a, 12b.

As already mentioned, with the frame assembly in its normal at rest position, fifth wheel plate 54 has its top face substantially horizontal and facing upwardly. With this position of the lower fifth wheel plate, the bunk which rests thereon has its stakes 30 substantially upright. Biasing the frame assembly to its normal at rest position, but yieldably accommodating swinging movement of the frame assembly whereby the stakes may incline either forwardly or rearwardly to some extent, is a biasing means 80 associated with each trunnion assembly.

Each biasing means comprises a pair of rubber or elastomer pads 82, positioned with one beneath bar 44 and the other under bar 46. Thus, the pads are on either side of the pivot axis provided by a trunnion assembly. The bottoms of the pads rest on base plate 63 of the trunnion assembly desired, pad retainer flanges 84 (see FIG. 4) may be included, joined to base plate 63, inhibiting shifting of the pads on the base plate.

The pads are deformable under pressure, with each accommodating while resisting downward swinging movement of the bar which is above it.

From the construction described, it will be apparent that bunk 32 supported on the frame assembly may be swung about the upright axis provided by the fifth wheel connection which connects the bunk and frame assembly. Swinging of the bunk about a horizontal, transversely extending axis is accommodated by the trunnion assemblies, which permit such swinging of the supporting frame assembly and through the frame assembly the bunk which is mounted thereon. While such swinging movement is permitted, it is resisted by the pads which bias the supporting frame assembly so that the bunk is positioned with its face extending upwardly.

In the truck and trailer combination, and referring now again to FIG. 1, with the truck and trailer traveling about a turn, swinging of the reach or beam of the trailer out of a position aligned with the longitudinal axis of the truck is permitted by the fifth wheel connection. On traveling over terrain which is not flat, whereby the trailer wheels are at a different elevation than the rear wheels of the truck, the angle that the load assumes relative to the plane of the truck frame changes. Such movement is accommodated by bunk 32, with the base of the bunk shifting to conform to the support plane required for the logs, and the stakes swinging so that their position relative to the sides of the logs remains unchanged. As a consequence, shifting of the load relative to the base of the bunk and the stakes is prevented, which has the effect of eliminating rubbing of the logs, stressing of the parts and of any chain or other means binding the logs together.

The construction contemplated is entirely practicable and serviceable. If replacement of the pads is necessary, such is easily done by removal of the trunnion pins and disassembly of the trunnion assemblies.

Of particular importance is the fact that the elastomer pads hold the bunk with its stakes upright with no load carried by the bunk. This facilitates the placement of a load in the bunk. Further, loose play in the bunk is removed, so that the bunk does not rattle and jar on jouncing of the truck frame by reason of truck movement.

While an embodiment of the invention has been described, obviously modifications and variations are possible without departing from the invention. It is desired to cover all such modifications and variations as would be apparent to one skilled in the art, and that come within the scope of the appended claims.

It is claimed and desired to secure by Letters Patent:
1. In a vehicle including a wheel-supported vehicle frame extending longitudinally of the vehicle, structure comprising:
   a supporting frame assembly disposed over and extending transversely of the vehicle frame, means interposed between the supporting frame assembly and vehicle frame connecting the two while accommodating pivoting of the former about a generally horizontal axis extending transversely of the latter, biasing means interposed between the vehicle frame and supporting frame assembly urging the supporting frame assembly to a predetermined position relative to the vehicle frame and yieldably resisting pivoting of the supporting frame assembly about said horizontal axis away from said predetermined position, said biasing means comprising at least a pair of spaced elastomer pads interposed between the supporting frame assembly and vehicle frame, one forwardly and one rearwardly on the vehicle frame from said horizontal axis, and means on the supporting frame assembly attaching a load carrier, with swiveling permitted the load carrier relative to the supporting frame assembly about a substantially upright axis with the supporting frame assembly in its predetermined position.

2. In a vehicle including a wheel-supported vehicle frame extending longitudinally of the vehicle, structure comprising:

a supporting frame assembly comprising a pair of laterally spaced bars extending transversely of the vehicle frame, means interposed between the supporting frame assembly and vehicle frame connecting the two while accommodating pivoting of the former about a generally horizontal axis extending transversely of the latter, and biasing means interposed between the vehicle frame and supporting frame assembly urging the supporting frame assembly to a predetermined position relative to the vehicle frame and yieldably resisting pivoting of the supporting frame assembly about said horizontal axis away from said predetermined position, said biasing means comprising, for each set of ends of said bars, and adjacent each side of the vehicle, elastomer pad means providing yieldable support for the set of ends of the bars.

3. The structure of claim 2, wherein said means connecting the vehicle frame and frame assembly comprises a pair of trunnion assemblies, one disposed adjacent each side of the vehicle, each trunnion assembly being positioned intermediate said bar means.

4. In a vehicle having a wheel-supported vehicle frame comprising laterally spaced frame longitudinals extending longitudinally of the vehicle, an elongated supporting frame assembly disposed over and extending transversely of said vehicle frame, said supporting frame assembly having an end portion overlying each frame longitudinal, a pair of opposed trunnion assemblies, one disposed beneath each end portion of said supporting frame assembly, each trunnion assembly connecting the supporting frame assembly to one of the frame longitudinals in the vehicle frame, a pair of biasing members disposed beneath each end portion of the supporting frame assembly and interposed between the supporting frame assembly and the frame longitudinal which the end portion of the supporting frame assembly overlies, the pair of biasing members having opposed biasing actions effective to tend to maintain the supporting frame assembly in a predetermined position, and a bunk including spaced opposed stakes swiveled on the supporting frame assembly with the stakes upright with the supporting frame assembly in its predetermined position.

5. The vehicle of claim 4, wherein said pair of biasing members beneath each end portion of the supporting frame assembly comprises a pair of spaced elastomer pads.

References Cited
UNITED STATES PATENTS

| | | | |
|---|---|---|---|
| 2,520,776 | 6/1950 | Page | 280—404 |
| 3,123,380 | 3/1964 | Grim et al. | 280—404 |
| 3,156,487 | 11/1964 | Bigge | 280—404X |
| 3,356,387 | 12/1967 | Skirvin et al. | 280—404 |

FOREIGN PATENTS

| | | |
|---|---|---|
| 705,343 | 4/1941 | Germany. |
| 86,663 | 9/1920 | Switzerland. |

LEO FRIAGLIA, *Primary Examiner.*